United States Patent

[11] 3,629,579

[72] Inventor Hideo Naitou
 Mito-shi, Japan
[21] Appl. No. 3,374
[22] Filed Jan. 16, 1970
[45] Patented Dec. 21, 1971
[73] Assignee Hitachi, Ltd.
 Tokyo, Japan

[54] ELECTRON PROBE SPECIMEN STAGE WITH A SCATTERED ELECTRON DETECTOR MOUNTED THEREON
14 Claims, 15 Drawing Figs.
[52] U.S. Cl. .................................................. 250/49.5 B,
 250/49.5 PE, 250/71.5, 250/227
[51] Int. Cl. .................................................... H01j 37/20
[50] Field of Search .......................................... 250/49.5 A,
 49.5 B, 49.5 PE, 49.5 P

[56] References Cited
UNITED STATES PATENTS
3,472,997 10/1969 Kareh ........................... 250/49.5 A
3,509,335 4/1970 Nixon ........................... 250/49.5 B

*Primary Examiner*—James W. Lawrence
*Assistant Examiner*—C. E. Church
*Attorney*—Craig, Antonelli and Hill ABSTRACT: A scattered electron detection device for detecting secondary electrons and reflected electrons, characterized in that a scintillator element of the detection device is moved by means of a transferring mechanism which is movable in association with movements of a specimen stage finely movable in two directions in a horizontal plane, in such a manner that the transferring mechanism is moved following movements of the specimen stage in one of the directions but is held against movements of the specimen stage in the other direction orthogonal to said one direction.

FIG. 1 PRIOR ART

INVENTOR

HIDEO NAITOU

INVENTOR

HIDEO NAITOU

BY Craig, Antonelli, Stewart & Hill
ATTORNEYS

INVENTOR

HIDEO NAITOU

INVENTOR
HIDEO NAITOU

FIG. 10

INVENTOR

HIDEO NAITOU

ELECTRON PROBE SPECIMEN STAGE WITH A SCATTERED ELECTRON DETECTOR MOUNTED THEREON

This invention relates to a scattered electron detection device for electron-beam irradiating apparatus which analyzes a specimen qualitatively or quantitatively by bombarding an electron beam onto the surface of the specimen with an electron probe thereby to detect the resulting X-rays, scattered electrons such as secondary electrons and reflected electrons, and the like which contain information on the structure of the specimen's surface.

More particularly, the invention relates to a scattered electron detection device for detecting secondary electrons and reflected electrons, for such electron-beam irradiating apparatus as a scanning electron microscope and an electron probe microanalyzer.

In electron-beam irradiating apparatus such as the scanning electron microscope and the electron probe microanalyzer, the surface of a specimen to be analyzed is irradiated with or scanned by an electron beam of small diameter. There are thereby detected X-rays as well as scattered electrons such as reflected electrons and secondary electrons which all contain information on the surface topography of the specimen. Thus information on the topography of the specimen's surface may be obtained, the state of distribution of a specific element constituting the specimen and the potential distribution of semiconductors, etc.

Usual SEM (scanning electron microscope) and an EPM (electron probe microanalyzer) are provided in the vicinity of a specimen with a detector system comprising a plurality of detectors for simultaneously detecting, through electron-beam bombardment onto the specimen, certain information such as the primary reflected electrons, secondary emitted electrons, X-rays and electrons absorbed by the specimen.

In order to select an area to be analyzed on the specimen's surface, a specimen stage on which the specimen is placed is movable in two orthogonal traversing directions in a horizontal plane and the specimen under the electron beam is rotatable about the axis of the electron beam. In addition, for focusing of an optical microscope, the specimen stage is adapted to move up and down along a column axis.

The detector system and the specimen moving system should be disposed in the vicinity of the specimen, while an objective electron lens should have the least possible focal length in order to minimize spherical aberration. Therefore, the space between the bottom surface of the objective electron lens and the specimen surface on the specimen stage cannot but be restricted to the extreme.

In view of the above circumstances, the detector system has hitherto been equipped outside the movable range of the specimen moving system. Particularly, the scattered electron detection device for detecting reflected electrons and secondary electrons from the specimen has been fixedly equipped at a part of the column outside the movable range of the specimen stage, so that it has been difficult to efficiently detect scattered electrons from the electron-beam irradiated area on the specimen surface. Particularly the secondary electrons have considerably lower energy than the reflected electrons, so that various expedients heretofore made for the efficient collection of the former electrons have, in no case, achieved satisfactory effects due to the space limitation as mentioned above.

It is accordingly the first object of the invention to provide a new and improved scattered electron detection device wherein a scattered-electron a scintillator element and a photoelectric element is mounted on a specimen stage finely movable in two directions in a horizontal plane and thereby said detector is caused to follow the movement of the specimen stage to always bring the scattered-electron incident surface of the scintillator element of said detector to face an electron-beam irradiated area on the specimen surface, whereby scattered electrons may be efficiently collected even within a restricted space.

The second object of the invention is to provide a scattered electron detection device wherein a scintillator element of the detection device is moved by means of a transferring mechanism movable in association with the movements of a specimen stage finely movable in two directions in a horizontal plane, in such a manner that the transferring mechanism is moved following movements of the specimen stage in one of the directions but is held against movements of the specimen stage in the other direction orthogonal to said one direction, whereby irrespective of the moved position of the specimen stage, the incident surface of scattered electrons upon the scintillator element may always be brought to face an electron-beam irradiated area on the specimen surface, and simultaneously, the relative distance between the electron-beam irradiated area and the scintillator element may be kept approximately constant.

The third object of the invention is to provide a scattered electron detection device wherein only a scintillator element of the detection device is attached to a transferring mechanism which is movable in association with movements of a specimen stage finely movable in two directions in a horizontal plane, in such a manner that the transferring mechanism is moved following movements of the specimen stage in one of the directions but is held against movements of the specimen stage in one of the directions but is held against movements of the specimen stage in the other direction orthogonal to said one direction and wherein the scintillator element and a photoelectric element disposed at a part of a column outside the movable range of the specimen stage are connected by means of a flexible fiber optics bundle such as glass fiber, whereby scattered electrons may be efficiently detected without being subject to any spatial limit.

The fourth object of the invention is to provide a scattered electron detection device wherein a positively biased auxiliary electrode for collecting secondary emitted electrons is equipped at that part of the aforementioned transferring mechanism facing the electron-beam irradiated area, whereby under the resultant action with an electric field due to a positive voltage applied to a secondary electron-collecting electrode disposed at the scintillator element, particularly secondary electrons of low energy may be efficiently detected.

The fifth object of the invention is to provide an electron probe microanalyzer having a higher resolution than in the prior art, said electron probe analyzer being provided with a scattered electron detection device which follows, in a determined relation, movements of a specimen stage. Further objects of the invention will become apparent with reference to the following description taken in conjunction with the accompanying drawings, in which:

A scanning electron microscope as well as an electron probe microanalyzer qualitatively or quantitatively analyze a specimen by scanning two-dimensionally an area to be analyzed on the specimen surface with a demagnified electron beam (having a diameter of 1μ or less) and by detecting the resultant X-rays scattered electrons (Hereinbelow the expression "scattered electrons" shall mean reflected electrons and secondary electrons at least and shall not mean so-called stray electrons which become a cause of a background.), etc.

In the detection, the scattered electrons are incident upon a scintillator element disposed in the vicinity of the specimen, and are converted into light therein. This light is conducted to a photoelectric element such as a photomultiplier tube, wherein the incident light is converted into an electrical signal proportional thereto.

Figure 1:
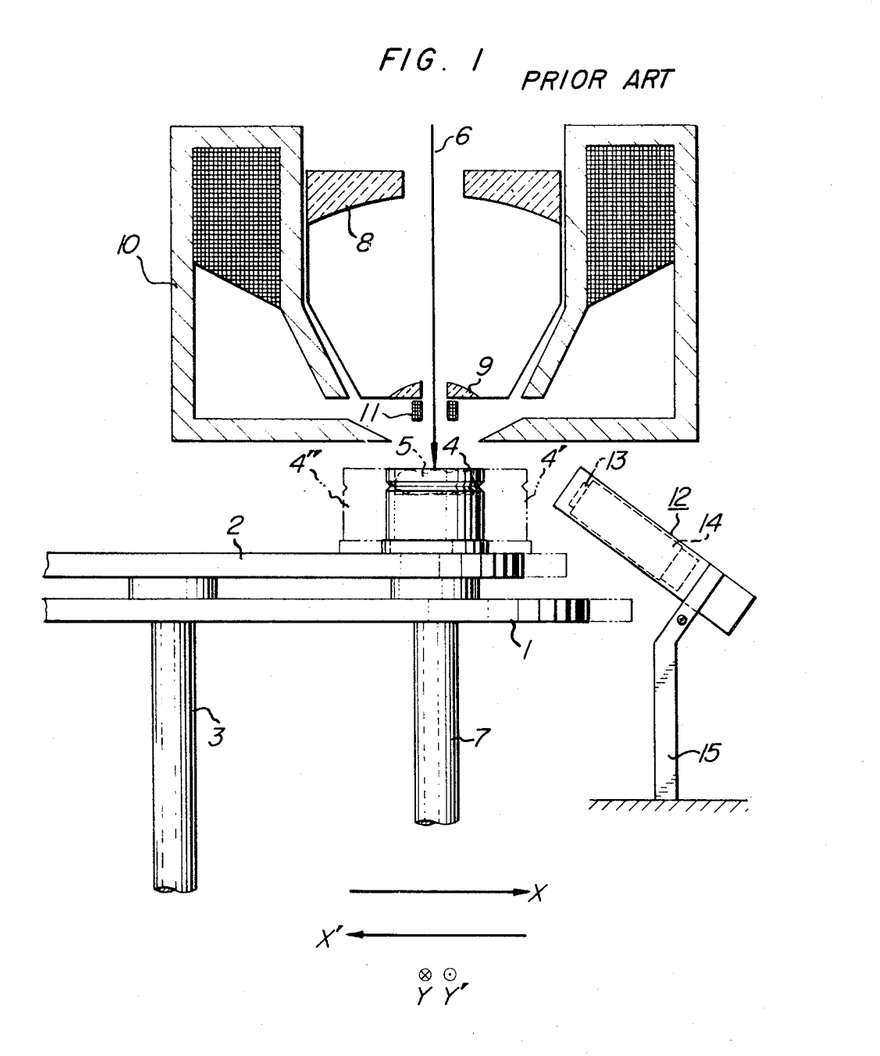
FIG. 1 shows a partly schematic, vertical, sectional view of a prior art scattered electron detection device applied to an electron probe microanalyzer.

In the prior art, the scattered electron detection device for detecting secondary electrons and reflected electrons has been disposed, as shown in FIG. 1, at a part of a column outside the movable range of a specimen stage and in the vicinity of the specimen stage. More particularly, referring to the figure, the reference numeral 1 designates the specimen stage which may be finely moved in two directions in a horizontal plane, while 2 a disk-shaped specimen selector which is finely movable in two directions in a horizontal plane in accordance with the movement of the specimen stage 1 and which is also rotatable about an axis 3 independent of the movement of the specimen stage 1. On the specimen selector are provided a plurality of specimen holders 4, each of which is placed thereon with a specimen 5 to be analyzed. A specimen holder 4 located in the analysis position under an electron beam 6 may be rotated about an axis 7 independent of the movements of the specimen stage 1 and the specimen selector disk 2. In order to focus reflection objective mirrors 8 and 9 of an optical microscope, a specimen moving system comprising the specimen stage 1 and the disk-shaped specimen selector 2 may be vertically moved up and down along a column axis (which agrees with the axis of the electron beam 6). Numeral 10 indicates an objective electron lens, and numeral 11 represents a deflection coil for two-dimensionally deflecting the electron beam. At 12 is designated the scattered electron detector, which comprises a scintillator element 13 and a photomultiplier tube 14 and which is fixed at a part of the column outside the range of movement of the specimen moving system, by means of a mounting frame 15.

The electron beam 6 (being 1μ or less in diameter) demagnified by the objective electron lens 10 is irradiated onto the surface of the specimen 5 on the specimen holder 4. The electron beam is deflected by means of the deflection coil 11, and thereby scans the surface of the specimen 5 in two dimensions. Scattered electrons resulting from the beam scanning are incident upon the scintillator element 13. Among the scattered electrons, primary electrons reflected from the specimen have, in general, high energy and hence are rapidly emitted from out of the specimen surface straightforward or linearly due to electron-beam bombardment onto the specimen surface. In contrast, secondary electrons have lower energy than reflected electrons, so that the former electrons are attracted to the scintillator element 13 under the action of an electric field for collecting secondary electrons, the electric field being based on a positive voltage applied to a secondary-electron collecting electrode usually provided for the scintillator element 13. In the above case, in order to select a spot to be analyzed on the surface of the specimen 5, such a desired spot for analysis is brought under the electron beam 6 by finely moving the specimen stage 1 in two directions in a horizontal plane.

When the scattered electron detector 12 is located, as shown in FIG. 1, outside the range of movement of the specimen moving system comprising the specimen stage 1 and the specimen selecting disk 2, a movement of the specimen stage 1 in the direction of X or X' the specimen holder 4 on which the specimen to be analyzed is placed will be displaced to a position of 4' or 4'', whereby the relative distance between the specimen 5 and the scattered electron detector 12 is changed. As a result, the electric field on the basis of the positive voltage for the secondary-electron collection as applied to the scintillator element 13 is not sufficiently extended, and it becomes difficult to efficiently collect secondary electrons with lower energy.

In case where the specimen stage 1 is moved in the directions of Y and Y' which are orthogonal to the X- and X'-senses, the relative direction between the specimen 5 and the scintillator element 13 is changed. Therefore, the prior art has been disadvantageous in the analysis of a very small area in that scattered electrons from the area can not be sufficiently collected. In addition, when the surface of the specimen is rough, it has been impossible to satisfactorily detect scattered electrons appearing from an area on which the electron beam is irradiated, due to a long distance between the area and the detector.

The aforementioned reasons as well as the disadvantage that the scattered electron detection device for detecting reflected electrons and secondary electrons may not be located at the optimum position because of the space limitation, have been one of the causes for deterioration of the resolution of a secondary-electron image or reflected-electron image of the specimen displayed on the screen of a cathode-ray tube.

Figure 2:
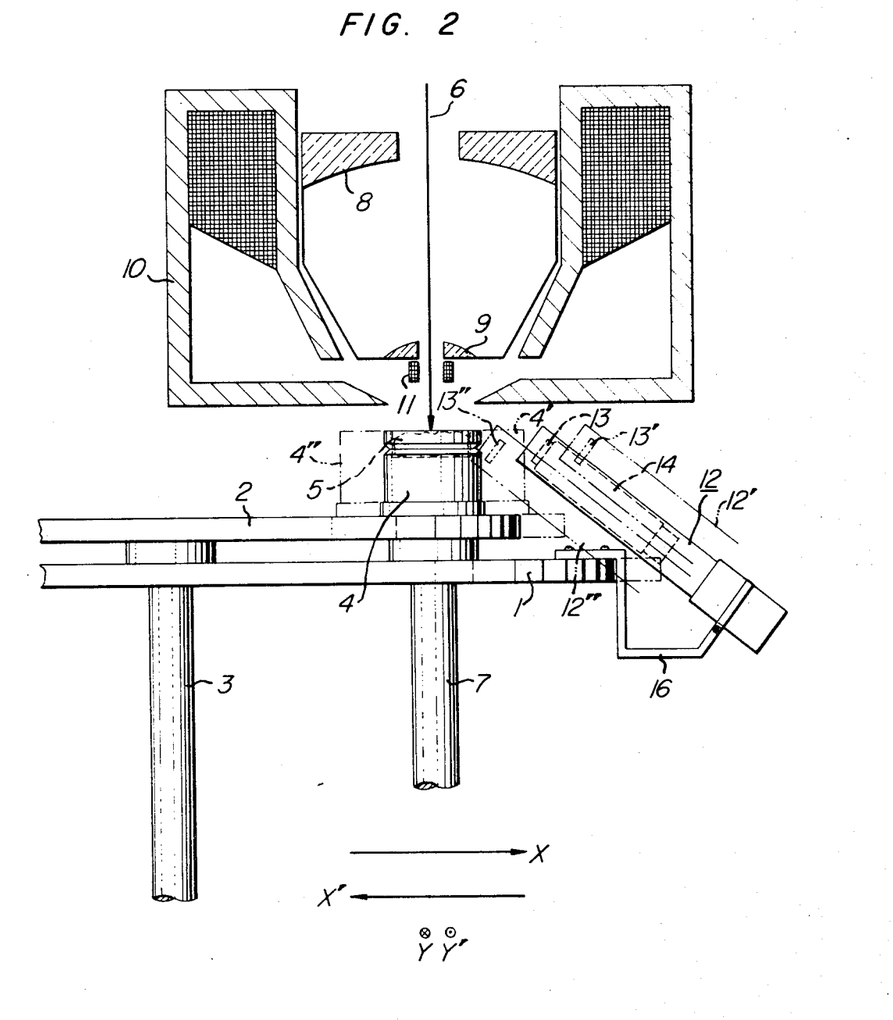
FIG. 2 shows a partly schematic, vertical, sectional view of a scattered electron detection device of one embodiment of the present invention applied to an electron probe analyzer.

In contrast, according to the present invention, the scattered electron detector 12 is fixedly mounted as shown in FIG. 2 at one end of the specimen stage 1 finely movable in two directions in a horizontal plane, and through a mounting frame 16.

More particularly, upon movement of the specimen stage 1 in the direction of the arrow X or X' thereby to locate the specimen holder 4 at the position of 4' or 4'' respectively, the scattered electron detector 12 is correspondingly moved to the position of 12' or 12'' respectively. Accordingly, as is well known it is not required to dispose the scattered electron detector 12 outside the movable range of the specimen moving system, but it is possible to attach the same much nearer to the electron beam irradiated area on the specimen 5. In addition, the detector is also moved in accordance with the movement of the specimen stage, so that the relative distance between the specimen holder 4 and the scintillator element 13 is not changed. As a result, the electric field based on the positive voltage applied to the secondary-electron collecting electrode which is provided for the scintillator element, effectively functions to detect the secondary electrons or reflected electrons.

Even when the detector is mounted due to the spatial limitation on such position, as shown in FIG. 2, that the scattered-electron incident surface of the scintillator element 13 may not directly face to the direction of the scattered electrons from the electron-beam irradiated area on the surface of the specimen 5, the scattered electrons may be efficiently detected.

Referring now to FIGS. 3 to 6, a further embodiment of the invention will be described. Numeral 1 indicates the specimen stage which is finely movable in two directions in a horizontal plane, while 2 the disk-shaped specimen selector the upper surface of which is provided with a plurality of specimen holders 4. Each holder is placed with the specimen 5 to be analyzed. The specimen moving system comprising the specimen stage 1 and the disk-shaped specimen selector 2 is moved in the same manner as in FIG. 1.

At 17 is designated a cylindrical transferring member therein receiving the scintillator element 13. The transferring member is attached to a rail 19 mounted by means of a screw 18 onto the bottom surface of the objective electron lens 10 in such a manner that said transferring member may be moved along the rail 19 through rotary members 22 and 23 such as ball bearings which are provided on mounting frames 20 and 21 and at one end thereof.

The transferring member 17 is connected with the specimen stage 1 through a guide 26 which is attached to the mounting frame 20 by means of a mounting screw 24 and which has a groove 25 and through contact of a strut 27 provided at one end of the specimen stage 1 with the groove 25.

Upon movement of the specimen stage 1 in the X-or X'-direction, the transferring member 17 is moved in the X-or X'-direction respectively along the rail 19 through the guide 26 as well as the strut 27 in contact with the groove 25 formed in said guide.

On the other hand, when the specimen stage 1 is moved in the Y-or Y'-direction both being orthogonal to X- and X'-directions, the strut 27 only slides in the groove 25 of the guide 26, so that the transferring member 17 is not moved but remains at the position as it is.

Figure 3:
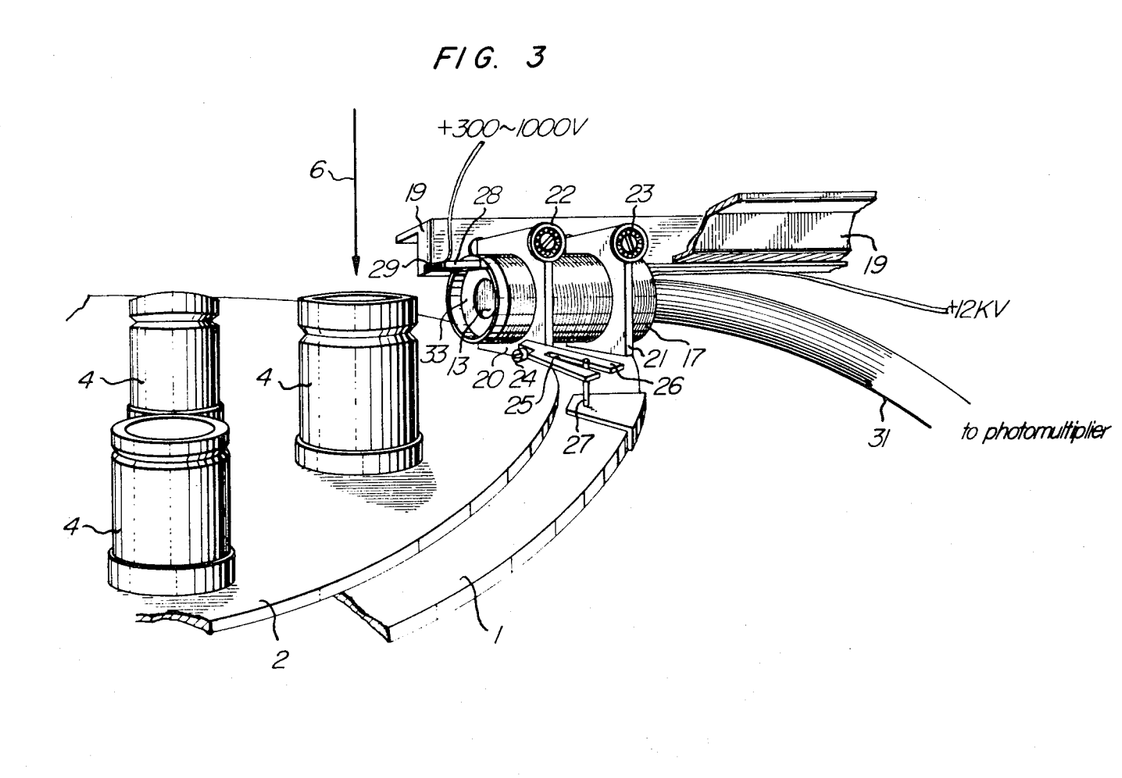
FIG. 3 illustrates a perspective view, partly in section, of another embodiment of the invention.
Figure 4:
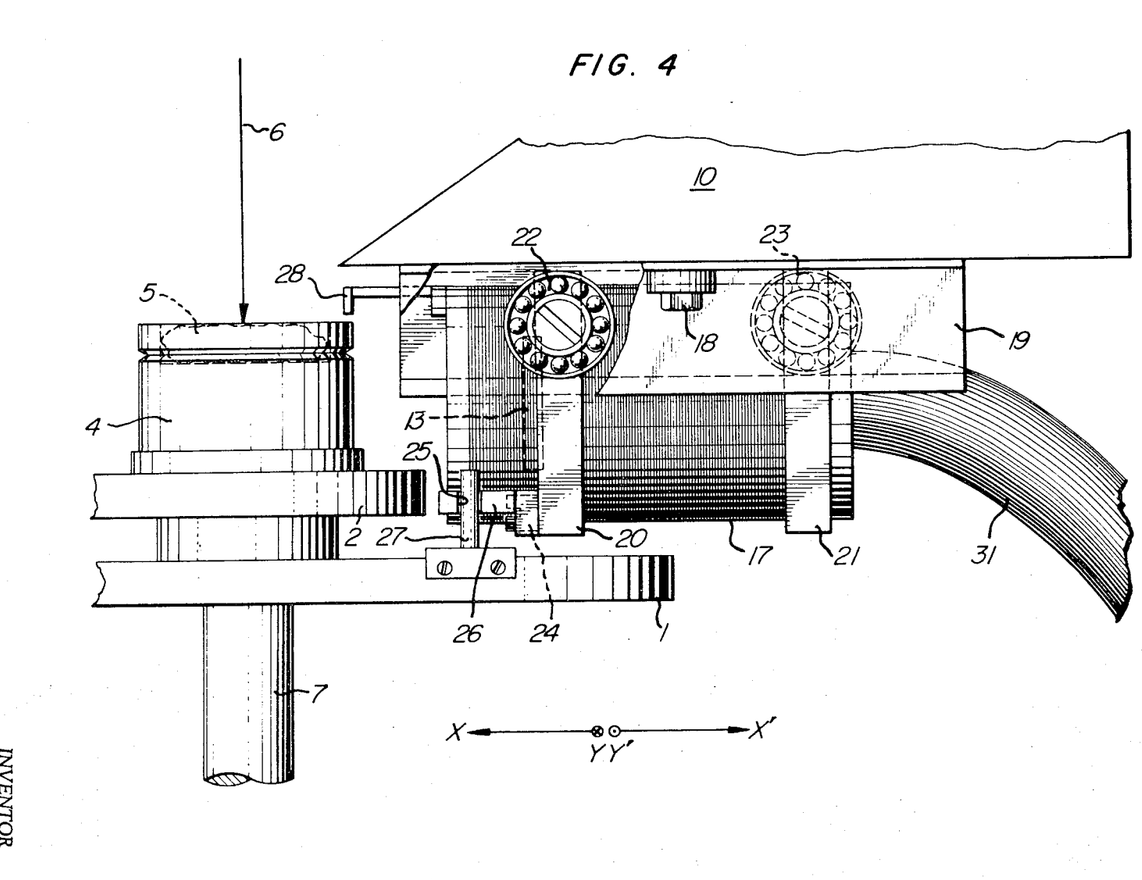
FIG. 4 depicts a side view, partly in longitudinal section, of FIG. 3.
Figure 5:
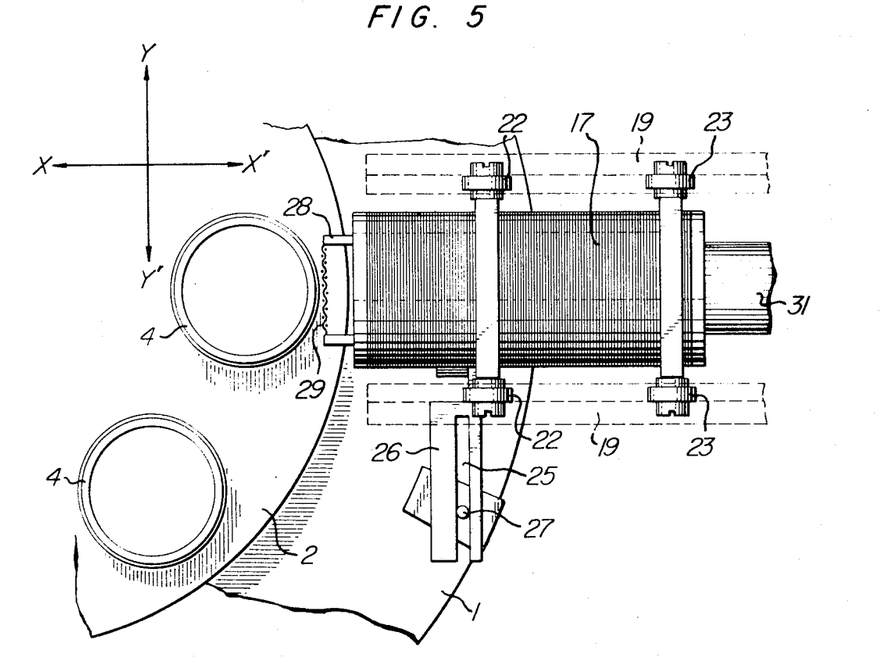
FIG. 5 depicts a plan view of FIG. 3.
Figure 6:
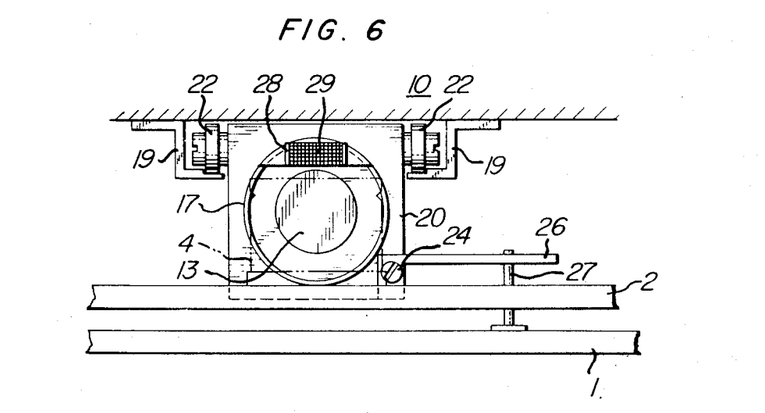
FIG. 6 depicts a front view of FIG. 3.
Figure 8:
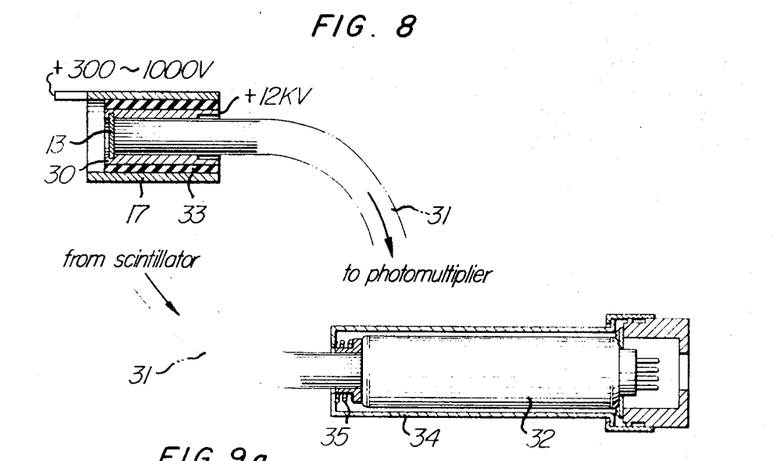
FIG. 8 illustrates a scintillator element and a photoelectric conversion element which are connected to each other with a flexible fiber optics bundle in the embodiment shown in FIG 3.

The reference numeral 29 designates a meshlike auxiliary electrode for application of a positive voltage of +300–+1,000 v. for the collection of secondary-electrons, the auxiliary electrode 29 being provided on an arm 28 extending at one end of the transferring member 17 towards the electron-beam irradiated area on the specimen 5. At 13 is indicated the scintillator element, the electron incident surface of which is coated with a metallic membrane of, for example, aluminum. A uniform positive voltage of +12 kv. is applied throughout the metallic membrane through a circular electrode 30 (see FIG. 8) around the electron incident surface.

Represented by 31 is a light guide consisting of a flexible bundle of optical fibers of 50μ diameter and having a diameter of 12 mm. The light guide 31 connects the scintillator element 13 housed inside the transferring member 17 and a photoelectric element 32. More detailed explanation will now be made, with reference to FIG. 8. As shown in the figure, the scintillator element 13 has its circumference surrounded by the circular electrode 30 for application of the positive voltage, and is housed in the transferring member 17 through an insulating material 33. The light guide 31 is received at one end thereof in a shield case 34 for shielding light, and is pushed by a spring 35 against the light receiving face of the photomultiplier tube 32 which is provided at a part of the column which is not so severely subjected to the spatial limitation.

Using the construction as described above, the operation and advantages of this embodiment will now be explained.

Figure 9A:
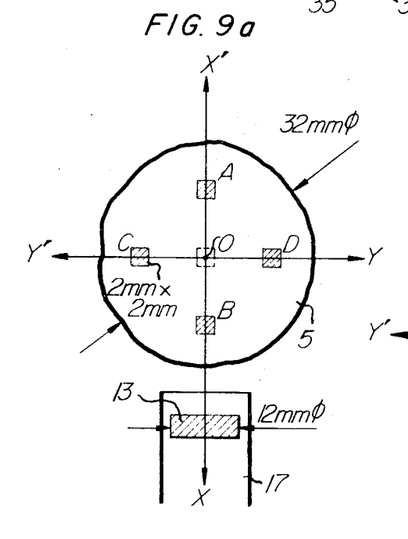
FIGS. 9a to 9e are diagrams for illustrating of the relative relationship between the scintillator element in the embodiment shown in FIG. 3 and electron-beam irradiated areas on a specimen.

FIG. 9a schematically illustrates the relative positions and magnitudes among the specimen 5 to be analyzed, the scintillator element 13 received in the transferring member 17, and areas A, B, ..... scanned by the electron beam.

As shown in the figure, the specimen 5 is about 32 mm. in diameter, the electron probe with which the surface of the specimen is irradiated has a spot size less than 1μ in diameter, each area on the specimen 5 scanned by the electron probe is approximately 2 mm. × 2 mm. in size, and the scattered-electron incident face of the scintillator element 13 which collects such scattered electrons excited from the electron-beam scanning area as secondary electrons and reflected electrons is approximately 12 mm. in diameter. The electron probe scans an area of approximately 2 mm. × 2 mm., having its center at point O. Accordingly, it is required in the analysis to select an area to be analyzed on the specimen 5 and to bring this area to the electron-beam irradiated area O by suitably finely moving the specimen stage 1. Now description will be made of the case where areas to be analyzed on the specimen 5 are represented by four areas A, B, C and D.

Figure 9B:
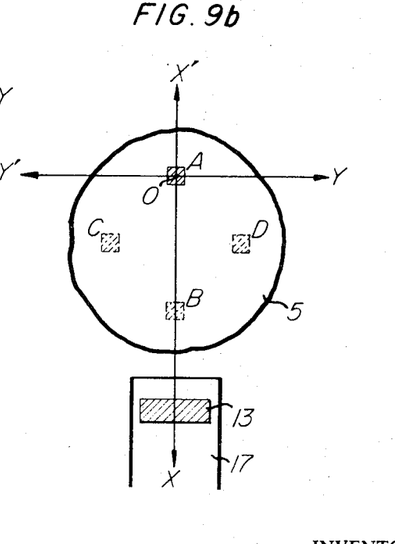

1. The analysis of the A-area will be explained with reference to FIG. 9b. In this case, the specimen stage 1, that is, the specimen 5 is moved in the X-direction from the position shown in FIG. 9a to bring the A-area to the electron-beam irradiated area O. Since the transferring member 17 is also moved in the X-directions along the rail 19, the facing relation between the scintillator element 13 and the A-area does not change. The relative distance also remains unchanged from that before the movement in the location shown in FIG. 9a.

Figure 9C:
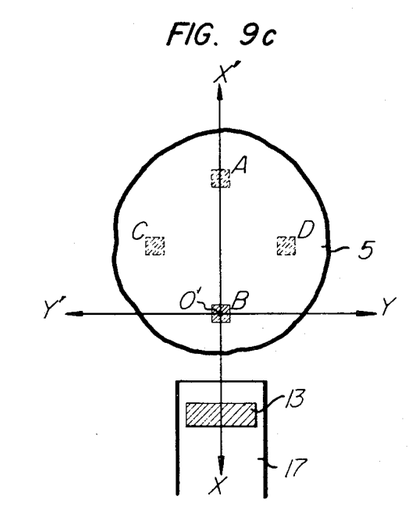

2. Consider the analysis of the B-area with reference to FIG. 9c. In this case, the specimen 5 is moved in the X'-directions thereby to bring the B-area to the electron-beam irradiated area O. Similarly to the case of 1, the transferring member 17 is also moved in the X'-direction, so that the relative relationship and the relative distance respectively between the scintillator element 13 and the B-area are maintained constant.

In both the above cases of (1) and (2), the direction in which the specimen is moved and that in which the scintillator element is moved agree with each other, and hence the electron incident surface of the scintillator element 13 is always facing to the electron-beam irradiated area on the specimen. In these cases, therefore, there are accomplished the same technical advantages as attained by the first embodiment described with reference to FIG. 2.

3. Description will now be made, with reference to FIG. 9d, of the case where the C-area is to be analyzed. In this case, the specimen 5 is moved in the Y-direction from the state shown in FIG. 9a thereby bringing the C-area to the electron-beam irradiated area O. This movement, however, only causes the strut 27 disposed at one end of the specimen stage 1 to slide in the groove 25 of the guide 26, and the transferring member 17 remains at its position where located. More particularly, although the electron incident surface of the scintillator element 13 was not so positioned in the state of FIG. 9a as to directly face the C-area, the above operation has caused only the specimen 5 to move in the Y-sense, with the result that the electron incident surface of the scintillator element 13 has become directly facing opposite to the C-area. Also the relative distance becomes shorter than in FIG. 9a.

4. The analysis of the D-area will now be explained with reference to FIG. 9e. The specimen 5 is moved in the Y' sense to bring the D-area to the electron-beam irradiated area O. In this case, similarly to the case of (3), only the specimen 5 is moved in the Y'-direction, with the transferring member 17 remaining at its position where located. Accordingly, the D-area and the electron incident surface of the scintillator element 13 are directly faced to each other, and the relative distance therebetween becomes shorter when compared with that in the case of FIG. 9a.

Figure 9D:
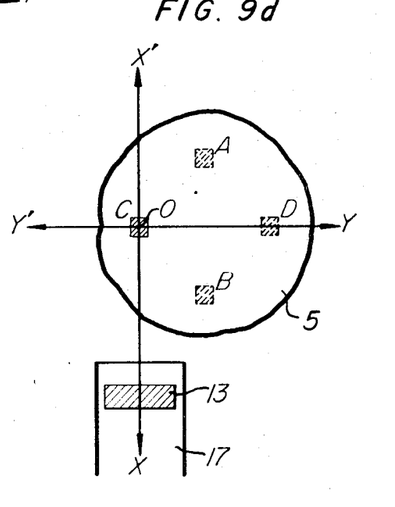
Figure 9E:
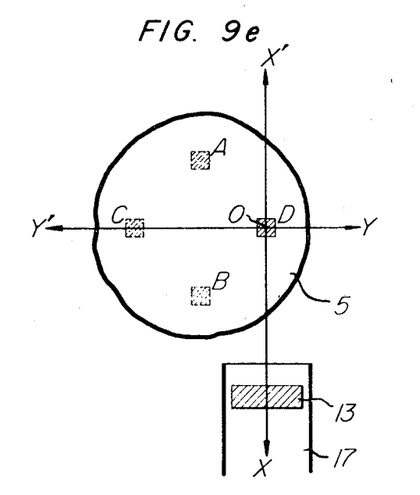

In the above cases of (3) and (4), even when the specimen stage 1 is moved, the strut 27 only slides in the groove 27 of the guide 26, and the transferring member 17 and accordingly the scintillator element 13 are maintained at their fixed positions without any movement.

Although in the foregoing description the analyses of the four areas of A, B, C and D have been representatively considered, an analysis of any other area than mentioned above may be considered by decomposing the direction of movement into vectors of X- and X'-directions and Y- and Y''-directions. Therefore, such decomposed directions becomes identical to either one of the cases (1)–(4), and such analysis becomes, as a consequence, a combined case of the individual cases of (1)–(4).

As detailed above, according to this embodiment, irrespective of the moved position of the specimen stage 1, that is, the specimen 5 the electron-beam scanning area on the surface of the specimen and the electron incident surface of the scintillator element 13 are always positioned to be directly faced. Also, the relative distance therebetween is kept constant in the cases of (3) and (4). Although said relative distance is changed with the distance of movement of the specimen stage 1 in the cases of (1) and (2), the scintillator element 13 is positioned considerably nearer to the electron-beam irradiated area on the specimen than in the case where the scattered electron detection device is equipped outside the movable range of the specimen moving system. As a result, jointly with the effect of extending the electric-field distribution due to the secondary-electron collecting electrodes, particularly the secondary electrons with low energy may be more efficiently collected.

Figure 7A:
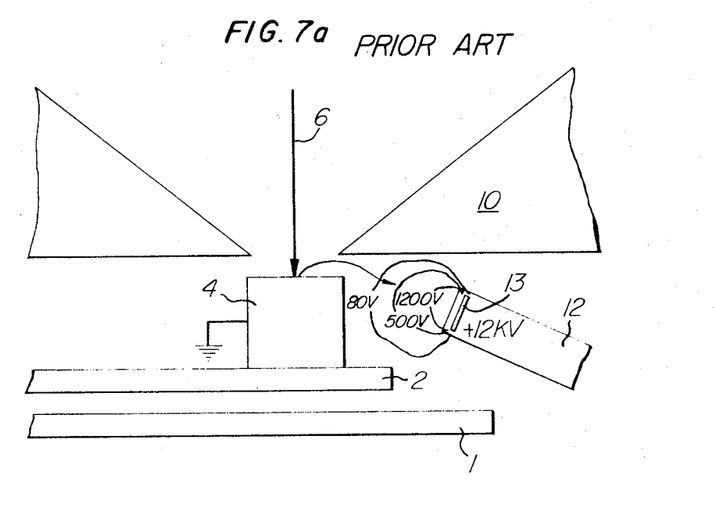
FIG. 7a illustrates a diagram of the distribution of electric field by a positive voltage applied to a secondary-electron collecting electrode disposed at a scintillator element in the prior art device shown in FIG. 1.
Figure 7B:
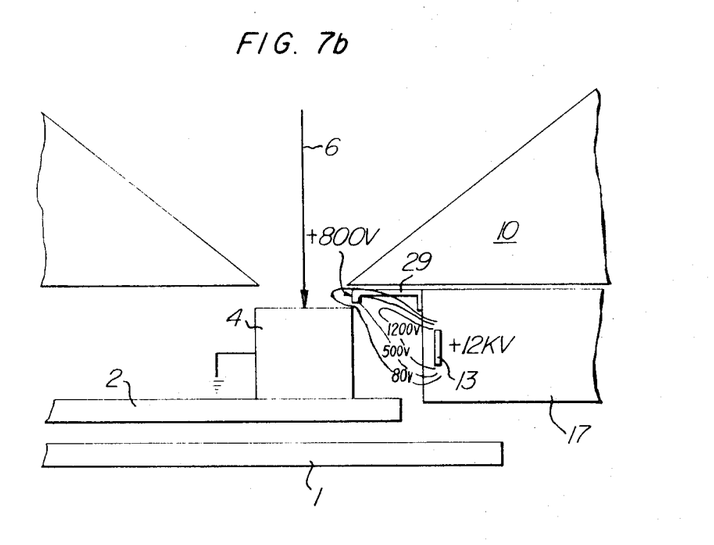
FIG. 7b illustrates a diagram of the distribution of electric field based upon a positive voltage applied to a secondary-electron collecting electrode disposed at a scintillator element in the embodiment shown in FIG. 3 and upon a further positive voltage applied to a secondary-electron collecting auxiliary electrode disposed at a part of a transferring mechanism.

FIG 7b illustrates the electric-field distribution in the case wherein the secondary-electron collecting electrode disposed at the scintillator element 13 is applied with a voltage of +12 kv. while the auxiliary electrode 29 disposed at one end of the transferring member 17 is applied with a voltage of +800 v. FIG. 7a depicts the electric-field distribution in the case wherein in the prior art device shown in and described with reference to FIG 1, a positive voltage of +12kv. is applied to the secondary-electron collecting electrode disposed at the scintillator element 13 of the scattered electron detector 12 which is fixed outside the movable range of the specimen moving system. In this case, the specimen holder 4 and accordingly the specimen under the irradiation of the electron beam are at ground potential. According to the second embodiment of the invention, the field distribution on the basis of the voltages of +12 kv. and +800 v. is developed, as shown in FIG. 7b, near to the electron-beam irradiated area on the specimen surface. Thus, the secondary electrons emitted from the above said area may be more efficiently collected than in the prior art, and the resolution of the secondary-electron image as well as the reflected-electron image of the specimen may be rapidly enhanced. By way of example, the resolution of a secondary-electron image obtained was approximately 1,000 1,000A. with the prior art device shown in FIG 1, whereas that of the same was rapidly increased to be as high as approximately 500 A. according to this embodiment.

There has hitherto been used for the scintillator element 13 a scattered-electron incident surface of comparatively large diameter, in order to enhance the electron-collecting efficiency for the scattered electrons within a restricted space. According to this embodiment, since the electron incident surface of the scintillator element 13 may be always faced to the scattered-electron appearing area on the specimen surface, the diameter of the scintillator element used may be comparatively small, which permits an effective utilization of space.

It has heretofore been unavoidable in the case of low electron-collecting efficiency for the scattered electrons to increase the sensitivity of the photomultiplier tube by raising the applied voltage between the cathode and anode of said tube for observation of a specimen image. This has, however, been disadvantageous for detection of small signals since noises due to the dark current etc. of the photomultiplier tube have also been increased. In accordance with this embodiment, since the scattered-electron collecting efficiency has been further increased relative to the prior art, the cathode-anode applied voltage of the photomultiplier tube may be reduced. Accordingly, noises may also be reduced, so that the invention is more advantageous for detection of small signals.

Figure 10:
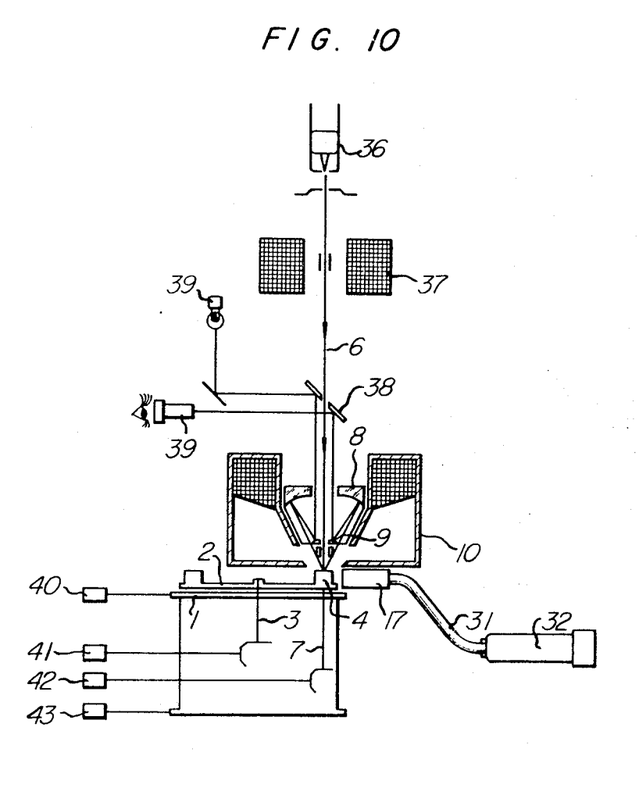
FIG. 10 shows a schematic view wherein the embodiment shown in FIG. 3 is applied to an electron probe microanalyzer.

FIG. 10 is a schematic view showing an electron probe microanalyzer to which the scattered electron detection device embodying the invention and shown in FIG. 3 is attached. In the figure, the reference numeral 36 designates an electron gun. An electron beam 6 from the electron gun is demagnified by a first condenser lens 37 and a second condenser lens (objective lens) 10, and is thereby focused onto the surface of a specimen on the specimen holder 4.

At 1 is designated the specimen holder finely movable in two directions in a horizontal plane and at 2 is represented the disk-shaped specimen selector rotatable about the axis 3, and these two members may be respectively operated by knobs 40 and 41 from outside the vacuum system. The specimen holder 4 thereon placed with specimens may be rotated, when located in the analysis position under the electron beam, about the axis 7 by operating a knob 42 from outside vacuum. In addition, the specimen stage 1 and the specimen selecting disk 2 may be integrally moved up and down along the column axis through operation of a knob 43 from outside vacuum, in order to focus the optical microscope.

The optical microscope consists of a light source 39, a flat mirror 38, objective reflection mirrors 8 and 9, and a magnifier 39.

The scattered electron detection device comprises a transferring mechanism which follows movements of the specimen stage 1 in the above-mentioned relation and which receives the scintillator element therein, the light guide 31 including flexible optical fibers, and the photoelectric element 32 such as a photomultiplier tube which is fixed at a part of the column outside the movable range of the specimen moving system consisting of the specimen stage 1 and the specimen selector disk 2.

The electron probe microanalyzer has its primary object in detecting X-rays generated by bombarding the electron beam onto the specimen, thereby to analyze the specimen qualitatively or quantitatively. Therefore, it is required that the surface of the specimen be located normal to the electron beam axis. Still, even in case where it is very difficult to attach the secondary-electron detection device due to restrictions in space or where it is unavoidable to disposed said detection device at such position between the bottom surface of the objective electron lens and the specimen holder as shown in FIG. 10 that the electron incident surface of the scintillator element is not directly faced in a direction of secondary-electrons emitted from the electron-beam irradiated area on the specimen surface, the secondary electrons may be efficiently collected owing to the electric-field distribution due to positive voltages applied to the transferring mechanism and the secondary-electron collecting electrodes.

In the above embodiments, description has been made of the cases wherein the scattered electron detection device is in any case subject to the spatial limitation and it is disposed at such position between a lower part of the objective electron lens and the specimen holder on the specimen stage that the scattered-electron incident surface of the scintillator is not directly faced in the direction in which the scattered electrons appear from the electron-beam irradiated area on the surface of the specimen. The invention, however, is not restricted to the foregoing embodiments, buy may of course be applied to the case where the scattered-electron incident surface of the scintillator is faced directly towards to where the scattered-electrons appear direction from the electron-beam irradiated area on the specimen surface—for example, where the surface of the specimen is inclined with respect to the electron beam axis. In this case, primary reflected electrons may be mainly detected by maintaining at the ground potential the accelerating electrode disposed on the surface of the scintillator and the auxiliary electrode disposed at the extreme end of the transferring mechanism, while secondary emitted electrons may be detected by applying positive voltages to the electrodes.

What is claimed is:

1. An apparatus for bombarding a specimen with an electron-beam and detecting scattered electrons produced by the bombardment, comprising an electron gun; and objective electron lens for focusing an electron beam from said electron gun onto a selected area for analysis on the specimen; specimen moving means to move the specimen in two directions in a horizontal plane; transferring means responsive to movements of said specimen-moving means for following the movement of said moving means in one of the two directions and for holding a fixed position thereof during movement in the other direction orthogonal to said one direction; a scintillator element upon which impinge scattered electrons from said selected electron-beam irradiated area on the specimen, said scintillator element being mounted on said transferring means; and a photoelectric element for converting light produced by said scintillator element into an electric signal proportional to said light.

2. An apparatus for bombarding a specimen with an electron beam and detecting scattered electrons produced by the bombardment, comprising an electron gun; an objective electron lens for focusing an electron beam from said electron gun onto a selected area for analysis of the specimen; specimen moving means to move the specimen in two directions in a horizontal plane; transferring means responsive to movements of said specimen moving means for following the movement of said moving means in one of the two directions and for holding a fixed position thereof during movement in the other direction orthogonal to said one direction; a scintillator element upon which impinge scattered electrons from said selected electronlbeam irradiated area on the specimen, said scintillator element being mounted on said transferring means; a photoelectric element fixed at a part of a column outside the movable range of said specimen moving means; and a light guide including flexible optical fibers for conducting light produced by said scintillator element to said photoelectric element.

3. An electron probe microanalyzer comprising an electron gun; and objective electron lens for focusing an electron-beam from said electron gun onto a selected area for analysis on the specimen; specimen-moving means to move the specimen in two directions in a horizontal plane; transferring means responsive to movements of said specimen moving means for following the movement of said moving means in one of the two directions and for holding a fixed position thereof during movement in the other direction orthogonal to said one direction; a scintillator element attached to said transferring mechanism and coated on the surface thereof with a metallic membrane; means to apply a positive voltage to said scintillator element and being disposed therearound; an auxiliary electrode attached at one end of said transferring means facing said selected electron-beam irradiated area on the surface of the specimen, said auxiliary electrode producing an electric-field distribution in the area of said specimen due to said positive voltage applying means being connected thereto; a photoelectric element fixed outside the movable range of said specimen moving means; and a light guide including flexible optical fibers for conducting light produced by said scintillator element to said photoelectric element.

4. An electron beam apparatus comprising:
an electron beam source,
an electron beam condenser lens system comprising at least one condenser lens for demagnifying and focusing the electron beam from said source onto the specimen to be analyzed,
specimen-mounting means carrying the specimen for movement in two directions orthogonal to each other in a plane perpendicular to said electron beam,
moveable electron detector means having an electron incident surface for detecting electrons received from said specimen due to the irradiation of the electron beam, and
holding means coupling movement of said electron detector means to movement of said specimen mounting means for holding said electron incident surface of said detector means and the irradiated area of the specimen in a predetermined opposing relationship.

5. An electron beam apparatus as claimed in claim 4, wherein said electron detector means comprises a scintillator element for collecting the electrons advanced from said electron-beam irradiated area of the specimen and a photoelectric element for converting light generated by said scintillator element into electrical signals proportional to said light, and said holding means comprising means for directly connecting said detector means to said specimen mounting means.

6. An electron beam apparatus as claimed in claim 4, wherein said electron detector means comprises a scintillator element for collecting the electrons advanced from said electron-beam irradiated area of the specimen, and said holding means comprises a transferring casing member engaged at a bottom part of the last stage condenser lens of said lens system in the vicinity of said specimen mounting means, said casing member accommodating therein said scintillator element and being movable in parallel with one of said two directions of movement of said specimen mounting means, and means for movably engaging said casing member to said specimen mounting means to move said member in accordance with movement of said specimen mounting means in said one direction and to hold said member against movement of said specimen mounting means in the other direction of said two orthogonal directions; said apparatus further comprising a photoelectric element for converting light produced by said scintillator element into electrical signals proportional to said light.

7. An electron beam apparatus as claimed in claim 4, wherein said electron detector means comprises a scintillator element for collecting the electrons advanced from an electron-beam irradiated area of the specimen and a photoelectric element for converting light generated by said scintillator element into electrical signals proportional to said light; said holding means comprising a transferring casing member engaged at a bottom part of the last stage condenser lens of said lens system in the vicinity of said specimen mounting means, said casing member accommodating therein said scintillator element and said photoelectric element and being movable in parallel with one of said two directions of movement of said specimen mounting means, and means for engaging said casing member to said specimen mounting means to move said member in accordance with movement of said specimen mounting means in said one direction and to hold said member against movement of said specimen mounting means in the other direction of said two orthogonal directions.

8. An electron beam apparatus as claimed in claim 7, further comprising a light guide composed of flexible optical fibers for conducting the light generated by said scintillator element to said photoelectric element, wherein said photoelectric element is secured to said apparatus.

9. A electron beam apparatus as claimed in claim 6, wherein said scintillator element includes a metal film coating which forms said electron incident surface of said detector means; and said detector means further comprises means to apply a first positive voltage to said scintillator element and being disposed therearound and an auxiliary electrode being fed at a second positive voltage and being attached at one end of said transferring casing member so as to oppose said electron-beam irradiated area of the specimen, said auxiliary electrode providing an electric-field distribution due to the first positive voltage of said scintillator.

10. An electron beam apparatus as claimed in claim 7, wherein said transferring casing member is located above said specimen mounting means and below said last stage condenser lens system and on a side of said specimen mounting means at a certain distance therefrom, so that said electron incident surface of said scintillator element does not directly face the irradiated area of the specimen.

11. An apparatus for bombarding a specimen with an electron-beam and detecting secondary electrons generated by the bombardment: comprising
an electron gun;
condenser lens means for focusing the electron beam from said electron gun onto a selected area for analysis of the specimen surface, said lens means being disposed as close as possible to the specimen for shortening the focal length of the lens;
a specimen stage movable in two directions perpendicular to each other in a plane perpendicular to said beam;
a transferring member movably engaged to a bottom part of said condenser lens means in the vicinity of said specimen stage so as to become movable in parallel with one of said two directions;
means for engaging said transferring member to said specimen stage to move said member in accordance with movement of said specimen stage in one of said two directions and to hold said member against movement of said specimen stage in the other direction;
a scintillator element mounted on said transferring member for collecting incident electrons from the electron-beam irradiated area of the specimen;
and a photoelectric element connected to said scintillator element for converting light produced by said scintillator element into an electric signal proportional to said light.

12. An apparatus for bombarding a specimen with an electron-beam and detecting secondary electrons generated by the bombardment, comprising
an electron gun;
condenser lens means for focusing the electron beam from said electron gun onto a selected area for analysis on the specimen surface, said lens being disposed as close to the specimen as possible for shortening the focal length of the lens;

a specimen stage movable in two perpendicular directions in a plane perpendicular to said beam;

transferring means movably engaged to a bottom part of said condenser lens means in the vicinity of said specimen stage so as to become movable in parallel with one of said two directions;

means for engaging said transferring means to said specimen stage to move said transferring means in accordance with movement of said specimen stage in one of said two directions and hold said transferring means against movement of said specimen stage in the other direction;

a scintillator element mounted on said transferring means for collecting incident electrons from the electron-beam irradiated area of the specimen;

a photoelectric element secured on said apparatus for converting light produced by said scintillator element into an electric signal proportional to said light;

and a light guide including flexible optical fibers for conducting light produced by said scintillator element to said photoelectric element.

13. An apparatus as claimed in claim 11, wherein said scintillator element is of a metal film coating which forms said electron incident surface of said detector means, further comprising means to apply a first positive voltage to said scintillator element and being disposed therearound and an auxiliary electrode being fed at a second positive voltage attached at one end of said transferring means and opposing said electron-beam irradiated area of he specimen, said auxiliary electrode providing an electric-field distribution by the first positive voltage of said scintillator.

14. An apparatus as claimed in claim 12, wherein said transferring means comprises cylindrical casing having mounting frames secured therearound and ball bearing rotary members respectively attached to the frames, and rail means attached in parallel with said one of said two directions to said bottom part of said condenser lens means and receiving therein said rotary members whereby said cylindrical casing can travel along said rail means; and said engaging means comprises a U-shaped guide member defining a guide groove and secured in parallel with said other direction to one of said frames, and a strut member disposed on a peripheral part of said specimen stage and slidably engaged in the guide groove of said U-shaped member.

* * * * *

UNITED STATES PATENT OFFICE
CERTIFICATE OF CORRECTION

Patent No. 3,629,579          Dated December 21, 1971

Inventor(s) Hideo Naitou

It is certified that error appears in the above-identified patent and that said Letters Patent are hereby corrected as shown below:

Priority data should read:

--Japan, 4243/69, filed January 20, 1969, and

Japan, 67386/69, filed August 25, 1969--.

Signed and sealed this 29th day of May 1973.

(SEAL)
Attest:

EDWARD M. FLETCHER, JR.
Attesting Officer

ROBERT GOTTSCHALK
Commissioner of Patents